United States Patent
Ozue et al.

(10) Patent No.: US 6,813,109 B2
(45) Date of Patent: Nov. 2, 2004

(54) ROTARY MAGNETIC HEAD APPARATUS FOR PERFORMING REPRODUCTION OPERATIONS USING A PLURALITY OF REPRODUCTION HEADS WITHOUT DEPENDING ON THE ARRANGEMENT OF THE RECORDING TRACKS

(75) Inventors: Tadashi Ozue, Kanagawa (JP); Toshio Shirai, Kanagawa (JP); Tomohiro Ikegami, Chiba (JP); Takehiko Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/808,219

(22) Filed: Mar. 14, 2001

(65) Prior Publication Data

US 2001/0009482 A1 Jul. 26, 2001

Related U.S. Application Data

(63) Continuation of application No. 09/063,326, filed on Apr. 20, 1998, now abandoned.

(30) Foreign Application Priority Data

Apr. 25, 1997 (JP) .............................................. 9-109508

(51) Int. Cl.⁷ .............................................. G11B 15/14
(52) U.S. Cl. ........................................... 360/64; 360/21
(58) Field of Search ............................. 360/64, 21, 61, 360/62, 281, 272, 281.4, 281.7; 386/72, 74

(56) References Cited

U.S. PATENT DOCUMENTS

| 4,484,236 A | 11/1984 | Wilkinson |
| 4,605,974 A | 8/1986 | Ochi et al. |
| 4,926,273 A | 5/1990 | Tabuchi et al. |
| 5,341,248 A | 8/1994 | Amada et al. |
| 6,243,240 B1 * | 6/2001 | Ozue et al. .............. 360/281.4 |

* cited by examiner

Primary Examiner—Alan T Faber
(74) Attorney, Agent, or Firm—Frommer Lawrence & Haug LLP; William S. Frommer; Dennis M. Smid

(57) ABSTRACT

A rotary magnetic head apparatus which can be formed into a smaller size in which signals of a plurality of recording tracks which are recorded on a tape-like information recording medium are reproduced by using a plurality of reproduction heads without depending on the arrangement of the recording tracks in the information recording medium. The rotary magnetic head apparatus includes a rotary drum, a fixed drum, a reproduction signal selection device, a rotor reproduction signal wiring section, and a stator reproduction signal wiring section.

11 Claims, 15 Drawing Sheets

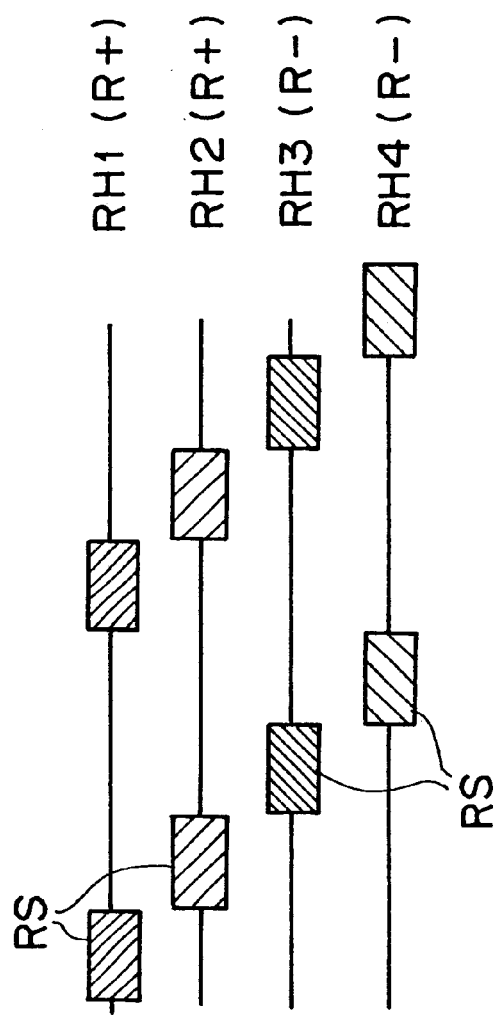
FIG. 9A
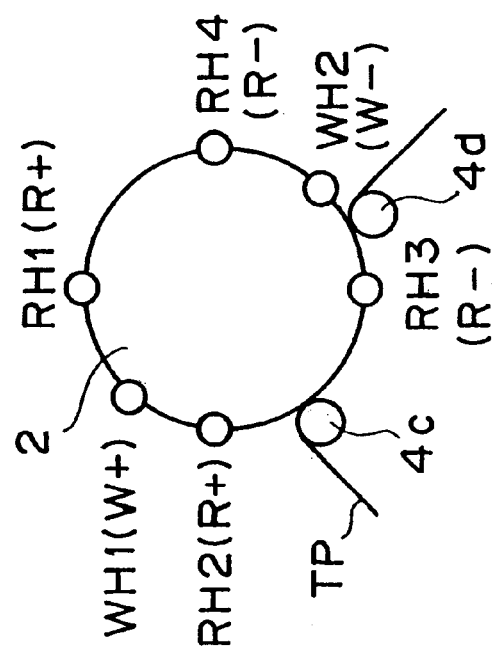
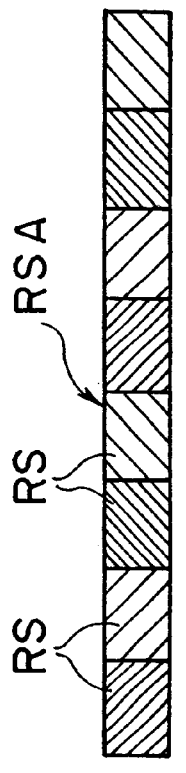
FIG. 9B

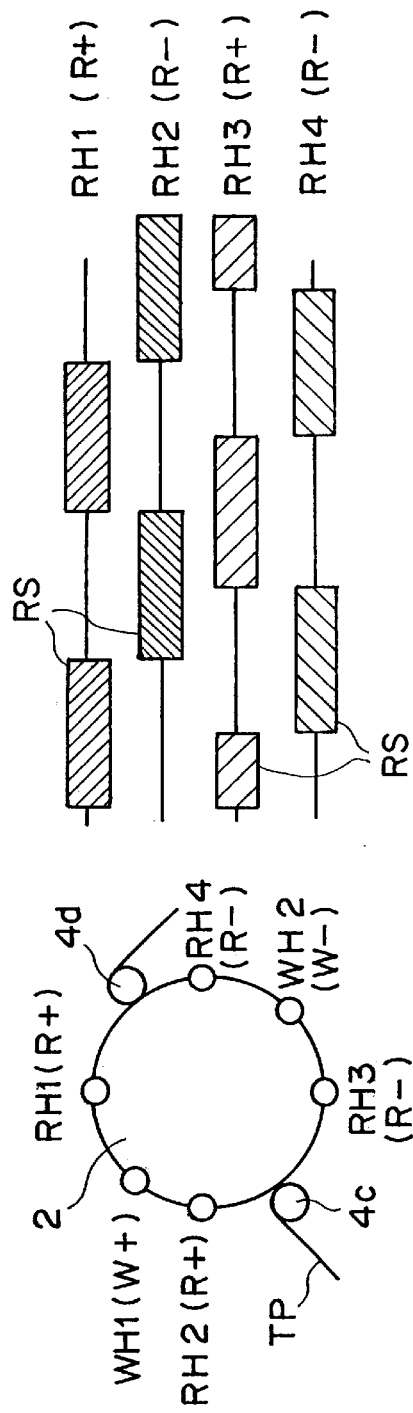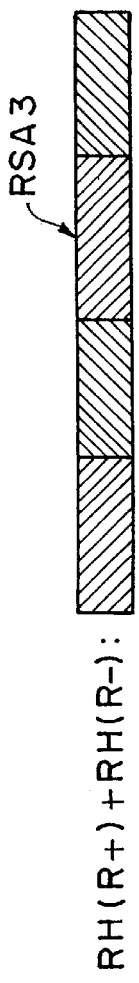

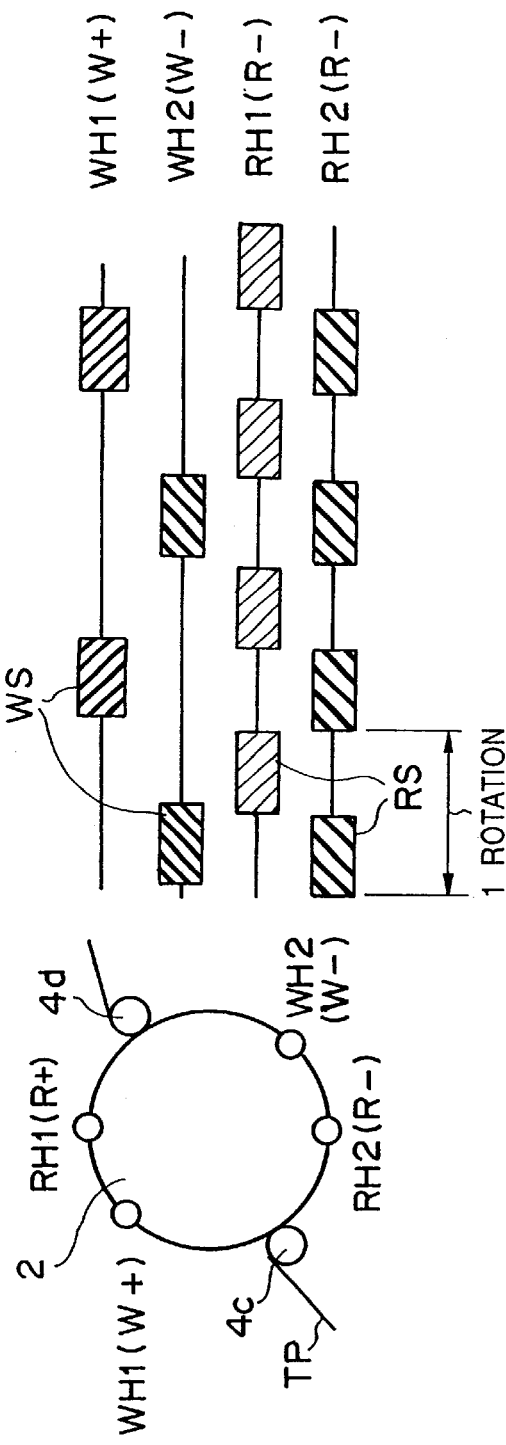

ROTARY MAGNETIC HEAD APPARATUS FOR PERFORMING REPRODUCTION OPERATIONS USING A PLURALITY OF REPRODUCTION HEADS WITHOUT DEPENDING ON THE ARRANGEMENT OF THE RECORDING TRACKS

This is a continuation of Application No. 09/063,326, filed Apr. 20, 1998, now abandoned.

BACKGROUND OF THE INVENTION

1. Field of the Invention

The present invention relates to a rotary magnetic head apparatus comprising a non-contact-type transmission apparatus for use in an information writing apparatus, such as a video tape recorder. More particularly, the present invention relates to a rotary magnetic head apparatus capable of reproducing signals of a plurality of recording tracks which are recorded on a tape-like information recording medium without depending on the arrangement of recording tracks in an information recording medium.

2. Description of the Related Art

Apparatuses for recording information onto a magnetic tape and reproducing information of a magnetic tape include video tape recorders, tape streamers, and the like. Such types of information writing apparatus comprise a rotary magnetic head apparatus for the purpose of recording a signal onto a magnetic tape and reproducing a signal of a magnetic tape.

The rotary magnetic head apparatus includes a rotary drum and a fixed drum, and the rotary drum includes a recording head and a reproduction head. The recording head is a head for recording a signal onto a magnetic tape, and the reproduction head is used to reproduce a signal recorded on a magnetic tape.

The rotary drum, which houses the recording head and the reproduction head, is rotated by the actuation of a motor with respect to the fixed drum, causing the recording head or the reproduction head to scan the magnetic tape, for example, by a helical scan method. Thus, information can be recorded onto a magnetic tape or information of a magnetic tape can be reproduced.

By adopting such a helical scan method, high-density recording of a signal onto a magnetic tape is made possible, and the relative speed between the magnetic tape and the magnetic head can be increased.

In the rotary magnetic head apparatus of a helical scan method, since the recording head and the reproduction head are housed inside the rotary drum, signals and power must be exchanged between this rotary drum and a fixed drum by a non-contact method; for example, in the case when a reproduction signal obtained from the reproduction head is transmitted from the rotary drum to the fixed drum, or when power for a circuit substrate is supplied from the fixed drum to the rotary drum.

In recent years, recording tracks which are recorded on a tape-like information recording medium are reproduced by what is commonly called a non-tracking method by setting a plurality of reproduction heads with respect to the rotary drum and by causing this plurality of reproduction heads to be rotated at a high speed. This non-tracking reproduction method is described below.

FIGS. 16A, 16B, and 16C show a tape-like information recording medium, for example, a magnetic tape TP such as a video tape. Recording tracks TC1 to TCn are formed in sequence at a high density on this magnetic tape TP. As shown in FIG. 16A, information has been recorded in adjacent recording tracks TC1 to TCn by +azimuth and −azimuth. In the tracking reproduction method which is conventionally used, a plurality of reproduction heads set in the rotary drum of the magnetic head apparatus reproduce the information of each recording track along the scan direction SC along each of the recording tracks TC1 to TCn.

However, in recent years, recording tracks have been getting increasingly narrower so that the recording density is increased, and the width of each recording track has been getting narrower. Therefore, in the case where each reproduction head accurately traces along the scan direction SC of the recording tracks by a tracking method and reproduces the information of each recording track as in the conventional art, the accuracy of the guide of the reproduction head, the error of the posture of the reproduction head in the rotary drum, and the like have a large influence, and reproduction with accuracy by a tracking method becomes very difficult.

Accordingly, a non-tracking reproduction method such as that described above has been proposed. For example, as shown in FIG. 16B, in the case where, as shown by the scan direction SC1 of a plurality of reproduction heads, when this scan direction SC is not parallel to the direction DD in which each recording track is formed and is inclined, that is, when the trace of the reproduction head during reproduction from the recording track is inclined, even though the area which is to be reproduced by a head of a particular azimuth is limited, in this method, by causing reproduction heads of a number, for example, twice that during recording to scan the recording tracks, it is possible for the adjacent reproduction heads with +azimuth and −azimuth of the rotary drum to trace all the recording tracks.

When, for example, a reproduction trace of a particular recorded track is taken note of, in the case where scanning at a twice-density is performed, the portions which cannot be read because the amplitude is small due to an inverse azimuth in the odd-number scans have the same azimuth at the same rotation phase of the next even-number scan, and the information of that recording track becomes capable of being always read. When this is repeated for some scans, data of one recording track is buried in sequence to a matrix, for example, like each of the recording areas RA1 and RA2 which form all the data of the recording tracks in such a manner as to be divided for some times, as shown in FIG. 16C, thereby the information ID of all the recording tracks can be reproduced. Such a method is a non-tracking reproduction method.

However, to realize such a non-tracking reproduction method, a plurality of reproduction heads, for example, four reproduction heads, are required. With an increase in the number of reproduction heads in this manner, in the rotary drum, the number of channels for signal transmission of the above-described rotary transformer set in the rotary magnetic head apparatus also increases to four. Therefore, the rotary drum and the fixed drum of the rotary magnetic head apparatus are forced to be enlarged, resulting in an increase in cost.

SUMMARY OF THE INVENTION

Accordingly, an object of the present invention, the achievement of which will solve the above-described problem, is to provide a rotary magnetic head apparatus capable of being formed into a smaller size in the case where signals of a plurality of recording tracks which are recorded on a tape-like information recording medium are reproduced by using a plurality of reproduction heads without depending on the arrangement of the recording tracks in the information recording medium.

To achieve the above-described object, according to the present invention, there is provided a rotary magnetic head apparatus which reproduces a signal of a plurality of recording tracks recorded on a tape-like information recording medium by using a plurality of reproduction heads without depending on the arrangement of the recording tracks in the information recording medium, the rotary magnetic head apparatus comprising: a transmission apparatus for transmitting power and signals between a rotor and a stator in a non-contact manner; a rotary drum having a rotor of a transmission apparatus and a plurality of reproduction heads; a fixed drum having a stator of the transmission apparatus; reproduction signal selection means for selecting a reproduction signal from each reproduction head and arranging the reproduction signal from each reproduction head in sequence; a rotor reproduction signal wiring section which is disposed in the rotor and to which a reproduction signal of each reproduction head is provided, which reproduction signal is transmitted from the reproduction signal selection means; and a stator reproduction signal wiring section, disposed in the stator, for receiving a reproduction signal in a non-contact manner from the rotor reproduction signal wiring section.

In the present invention, in the case where the signals of a plurality of recording tracks which are recorded on a tape-like information recording medium are reproduced by using a plurality of reproduction heads without depending on the arrangement of the recording tracks in the information recording medium, reproduction signal selection means selects a reproduction signal from each reproduction head and arranges the reproduction signal from each reproduction head.

Further, the rotor reproduction signal wiring section transmits a reproduction signal of each reproduction head transmitted from the reproduction signal selection means to the stator reproduction signal wiring section in a non-contact manner.

As a result, the rotary drum includes a plurality of reproduction heads. When a reproduction signal is obtained from each reproduction head, the reproduction signal selection means arranges a reproduction signal from these reproduction heads in sequence and provides the reproduction signals collectively to the rotor reproduction signal wiring section. Therefore, the rotor reproduction signal wiring section and the stator reproduction signal wiring section need to be provided for, for example, only one channel.

This makes it possible to greatly reduce the number of channels in the rotary magnetic head apparatus, and a smaller size of the rotary magnetic head apparatus is achieved.

The above and further objects, aspects and novel features of the invention will become more apparent from the following detailed description when read in connection with the accompanying drawings.

BRIEF DESCRIPTION OF THE DRAWINGS

FIGS. 9A and 9B show an example of the arrangement of each reproduction head and recording head, and an example of the arrangement of a reproduction signal of the reproduction head in the embodiment of FIG. 8.

FIGS. 13A, 13B, and 13C show an example of the arrangement of each reproduction head and recording head, and an example of the arrangement of a reproduction signal of the reproduction head in the embodiment of FIG. 12.

FIGS. 15A, 15B, and 15C show an example of the arrangement of each reproduction head and recording head, and an example of the arrangement of a reproduction signal of the reproduction head in the embodiment of FIG. 14.

DESCRIPTION OF THE PREFERRED EMBODIMENTS

The preferred embodiments of the present invention will be described below in detail with reference to the accompanying drawings.

Since the embodiments to be described below are preferred specific examples of the present invention, various technically preferred limitations are imposed. However, the present invention is not limited to these embodiments unless a description limiting the present invention is given in the following description.

Figure 1:
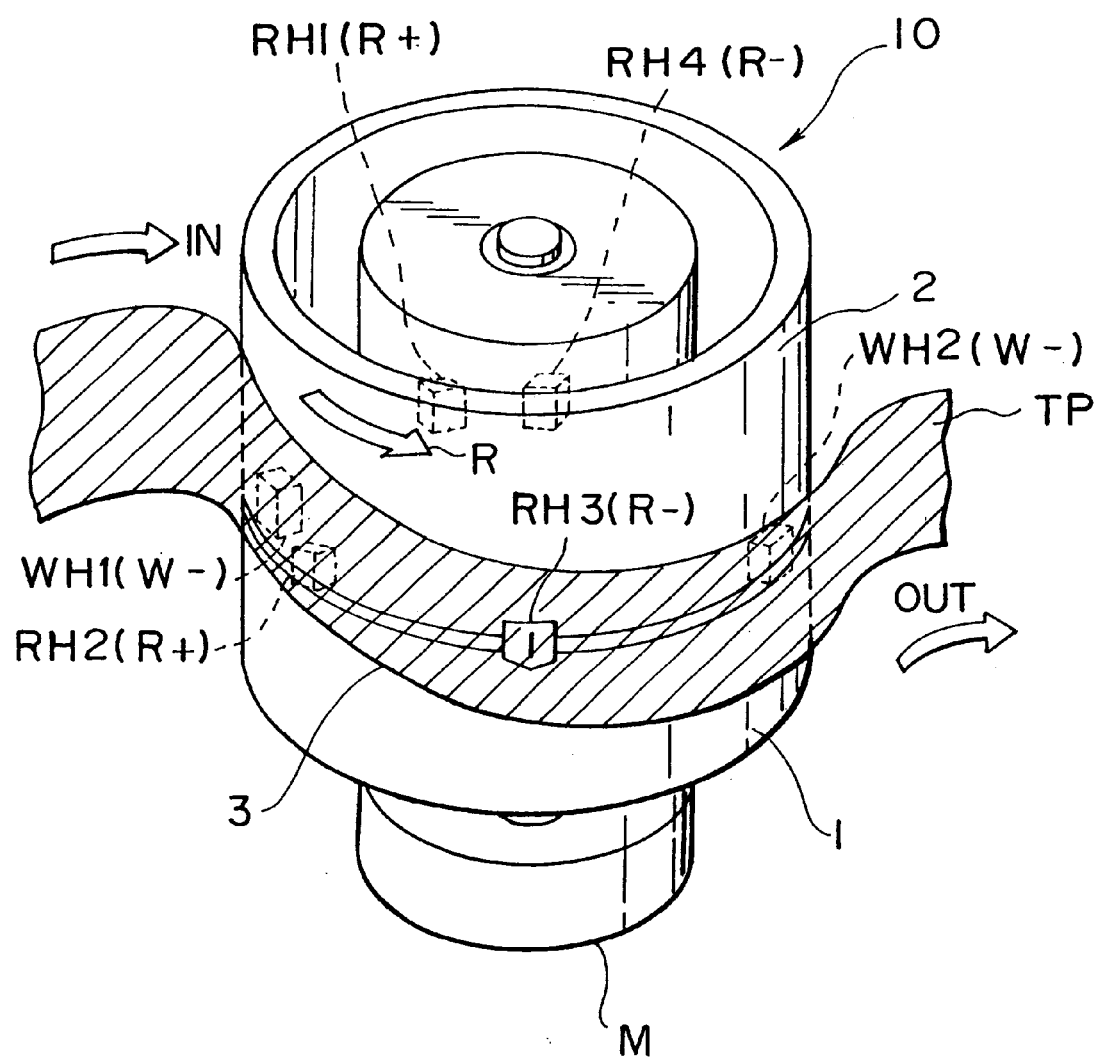
FIG. 1 is a perspective view showing an embodiment of a rotary magnetic head apparatus of the present invention.
Figure 2:
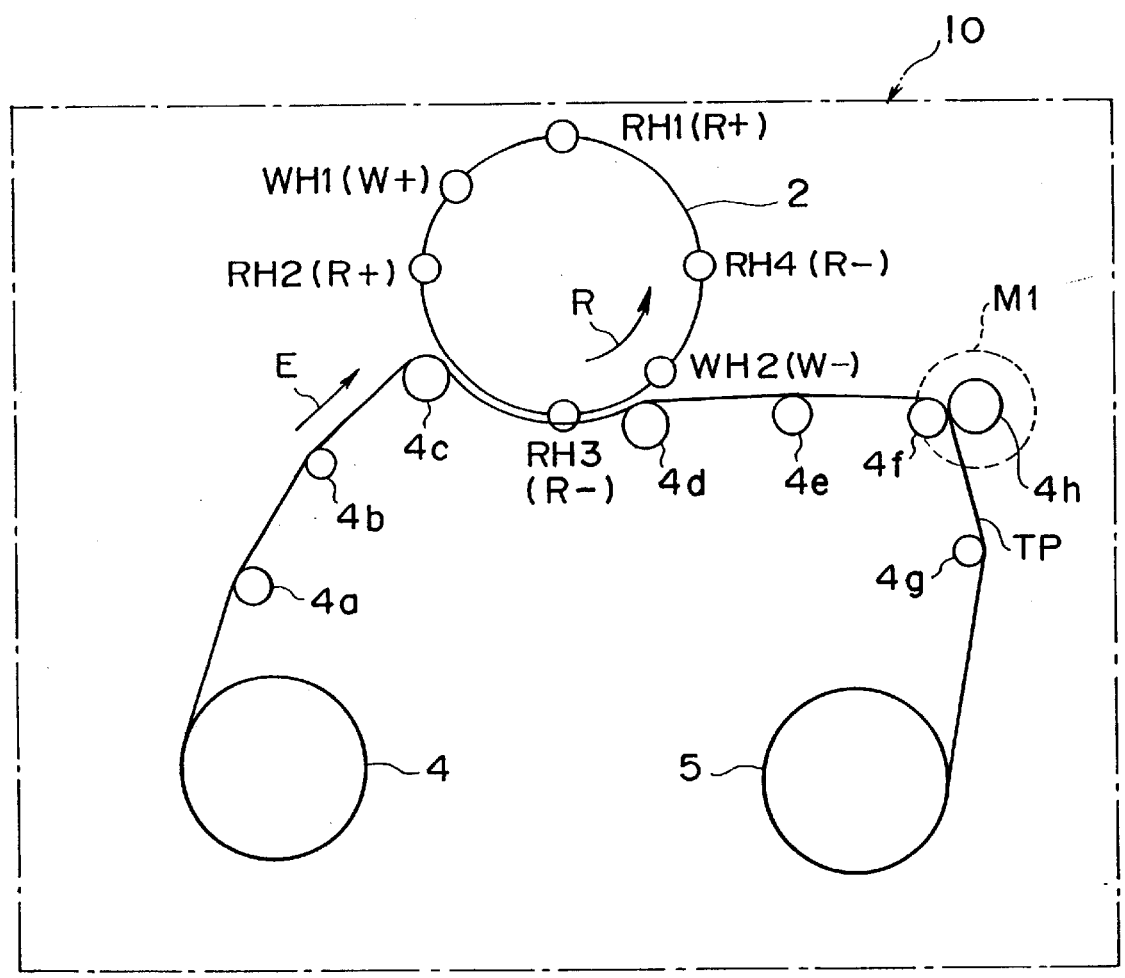
FIG. 2 is a plan view showing an example of an information writing apparatus including the rotary magnetic head apparatus of FIG. 1.

FIG. 1 shows a preferred embodiment of a rotary magnetic head apparatus comprising a non-contact-type transmission apparatus of the present invention. FIG. 2 shows an example of an information writing apparatus comprising a rotary magnetic head apparatus 10.

The rotary magnetic head apparatus 10 of this information writing apparatus utilizes a commonly called non-tracking reproduction method in which information is reproduced by using reproduction heads RH1 to RH4 without depending on the arrangement of recording tracks of a magnetic tape.

The rotary magnetic head apparatus 10 of FIGS. 1 and 2 is applicable to a video tape recorder, a data streamer, a digital audio system, and the like, and is used to record a signal onto a magnetic tape TP which is a tape-like recording medium and to reproduce information recorded on the magnetic tape TP.

The rotary magnetic head apparatus 10 of FIGS. 1 and 2 includes a fixed drum 1, a rotary drum 2, and a motor M.

The rotary drum 2 has, for example, four reproduction heads RH1 (R+), RH2 (R+), RH3 (R−), and RH4 (R−), and two recording heads WH1 and WH2. Each of the reproduction heads RH1 (R+), RH2 (R+), RH3 (R−), and RH4 (R−) has a phase difference of 90 degrees, and the recording heads WH1 and WH2 have a phase difference of 180 degrees. The rotary drum 2 rotates in the direction of the arrow R with respect to the fixed drum 1 by the actuation of the motor M. The rotary drum 2, and the recording head and the reproduction head rotate in the direction of the arrow R. The magnetic tape TP is fed obliquely along a tape feeding direction E from an entry side IN to an exit side OUT along a lead guide section 3 of the fixed drum 1.

In the information writing apparatus in FIG. 2, the magnetic tape TP is brought into close contact with almost 180 degrees of the rotary drum 2 and the fixed drum 1, after being through rollers 4a, 4b, and 4c from a supply reel 4, and can be taken up by a take-up reel 5 after being through the rollers 4d, 4e, 4f, and 4g. A capstan 4h is provided so that it corresponds to the roller 4f, and this capstan 4h is rotated by a capstan motor M1.

As a result, when the motor M is actuated and the rotary drum 2 is rotated in the R direction, the recording head and the reproduction head are brought into contact with the magnetic tape TP by a helical scan method and guided. The magnetic tape TP is fed obliquely along the lead guide section 3 of the fixed drum 1.

Figure 3:
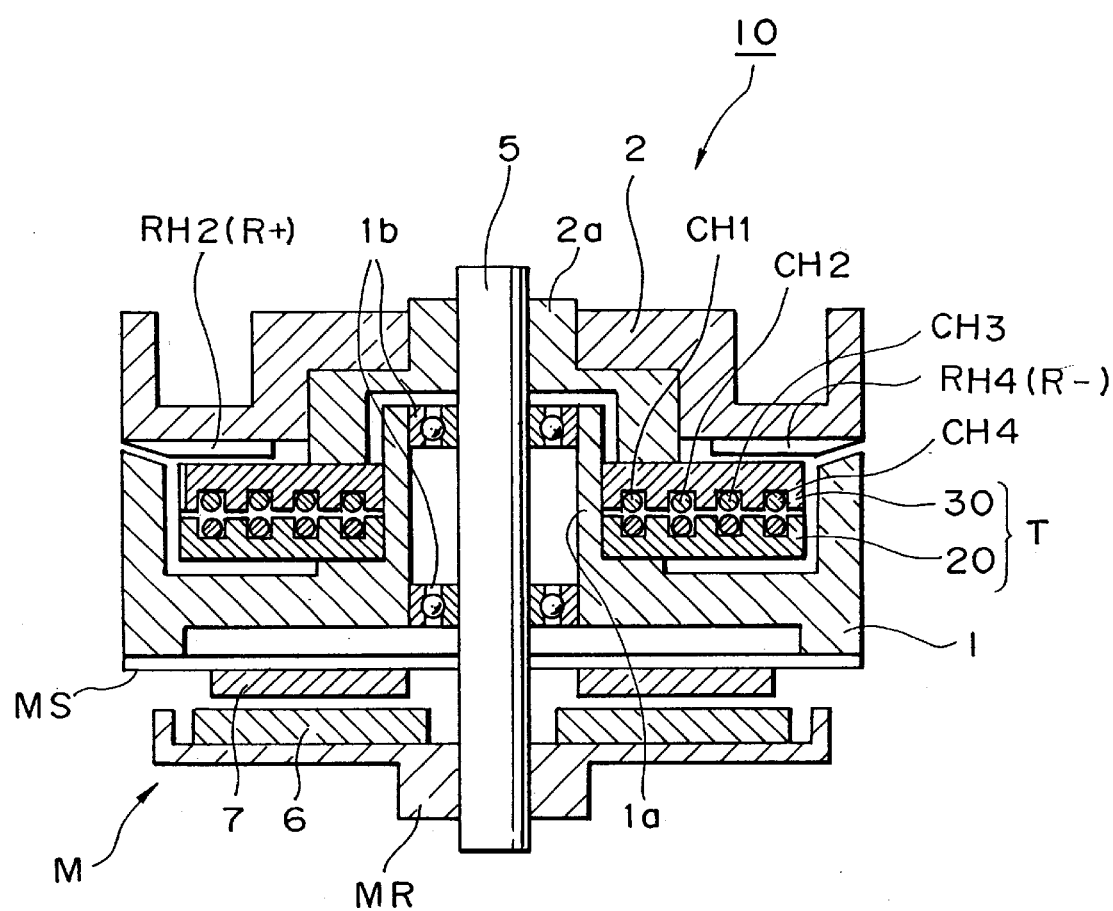
FIG. 3 shows an example of the construction of the rotary magnetic head apparatus of FIG. 1, also showing a case in which an incorporated rotary transformer is of a plane-opposing type.
Figure 4:
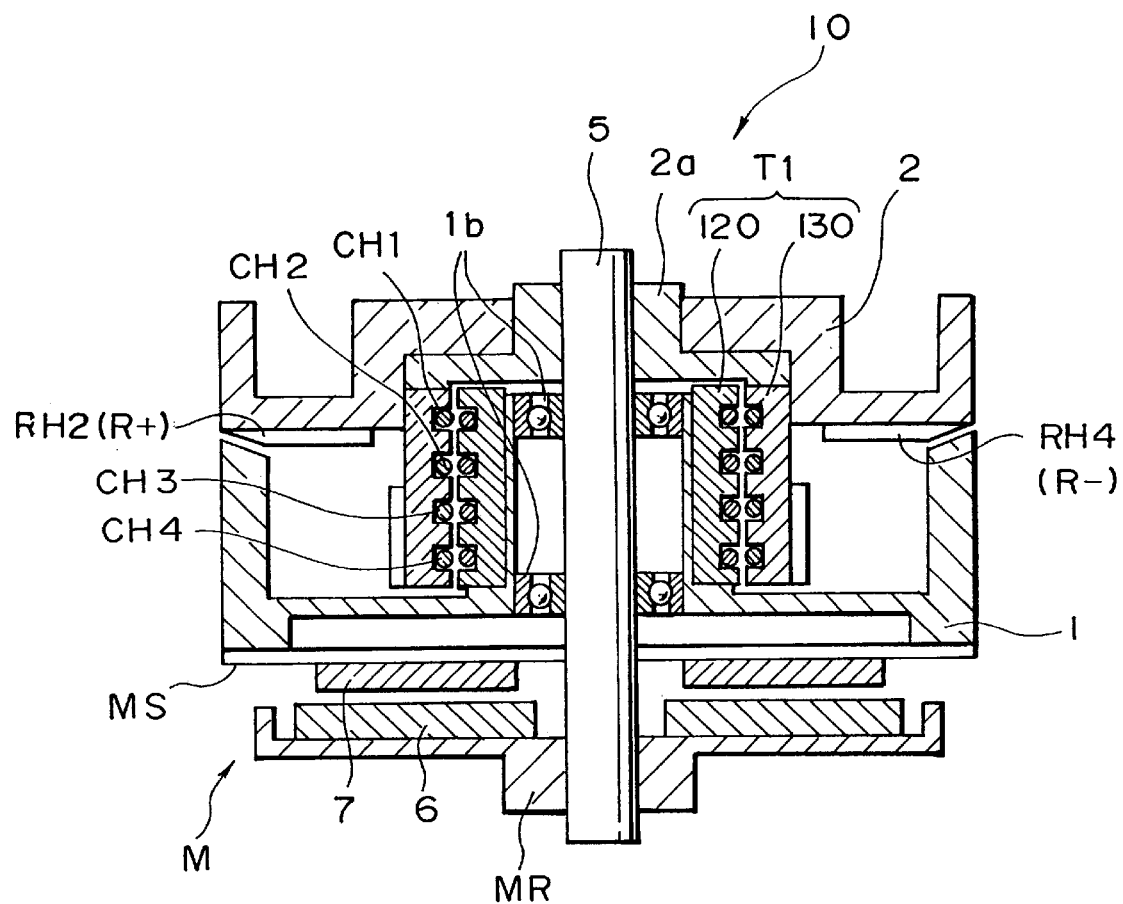
FIG. 4 shows another example of the construction of the rotary magnetic head apparatus of FIG. 1, also showing a case in which an incorporated rotary transformer is of a cylindrical type.

An example of the construction of this rotary magnetic head apparatus 10 is shown in FIGS. 3 and 4.

The rotary magnetic head apparatus 10 of FIG. 3 comprises a rotary transformer T which is a non-contact-type transmission apparatus. This rotary transformer T is disposed between the rotary drum 2 and the fixed drum 1. That is, the rotary transformer T is incorporated within the rotary magnetic head apparatus 10.

The rotary magnetic head apparatus 10 is also called a rotary drum apparatus, and two bearings 1b are disposed within a sleeve 1a of the fixed drum 1. The fixed drum 1 has fixed thereto a stator core 20 which is a stator of the rotary transformer T.

The rotary drum 2 has a flange 2a, and this flange 2a is fixed to the upper end portion of the shaft 5 by press-fitting or bonding. The lower end portion of the shaft 5 is fixed to a rotor MR of the motor M. The motor M includes the rotor MR and a stator MS. The rotor MR is provided with, for example, a driving magnet 6, and the stator MS is provided with, for example, a driving coil 7. By supplying power to this coil 7 in a predetermined pattern, the rotor MR of the motor M is rotated continuously.

The intermediate portion of the shaft 5 is rotatably supported by bearings 1b and 1b. Inside the flange 2a, a rotor core 30, which is a rotor of the rotary transformer T, is fixed.

Figure 5:
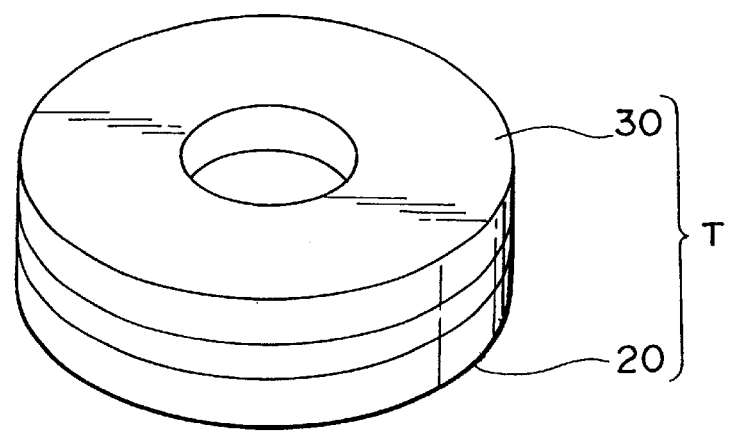
FIG. 5 is a perspective view showing the rotary transformer of FIG. 3.

The rotary transformer T of FIG. 3 is formed of the stator core 20 (stator) and the rotor core 30 (rotor), which are each a circular-plate-shaped core as shown in FIG. 5, and is made from a magnetic-permeable material, such as ferrite.

The stator core 20 and the rotor core 30 are formed in a ring form so that the sleeve 1a of FIG. 3 can be passed therethrough. Channels CH1 to CH4 for signal transmission are disposed in a ring form on the internal surface (the top surface in FIG. 3) of the stator core 20 and on the internal surface (the bottom surface in FIG. 3) of the rotor core 30 with the shaft 5 as the center, as will be described later.

The wiring section where these channels CH1 to CH4 are formed may be formed by winding a conventional, insulated wire material in a ring form, or a printed-wiring board may be used.

As a result, when power is supplied to the coil 7 of the stator MS of the motor M, the rotor MR of the motor M, the shaft 5, the flange 2a, the rotary drum 2, and the rotor core 30 of the rotary transformer T rotate with respect to the fixed drum 1 and the stator core 20. The rotor core 30 and the stator core 20 are disposed in such a manner as to oppose each other in a non-contact manner.

Figure 6:
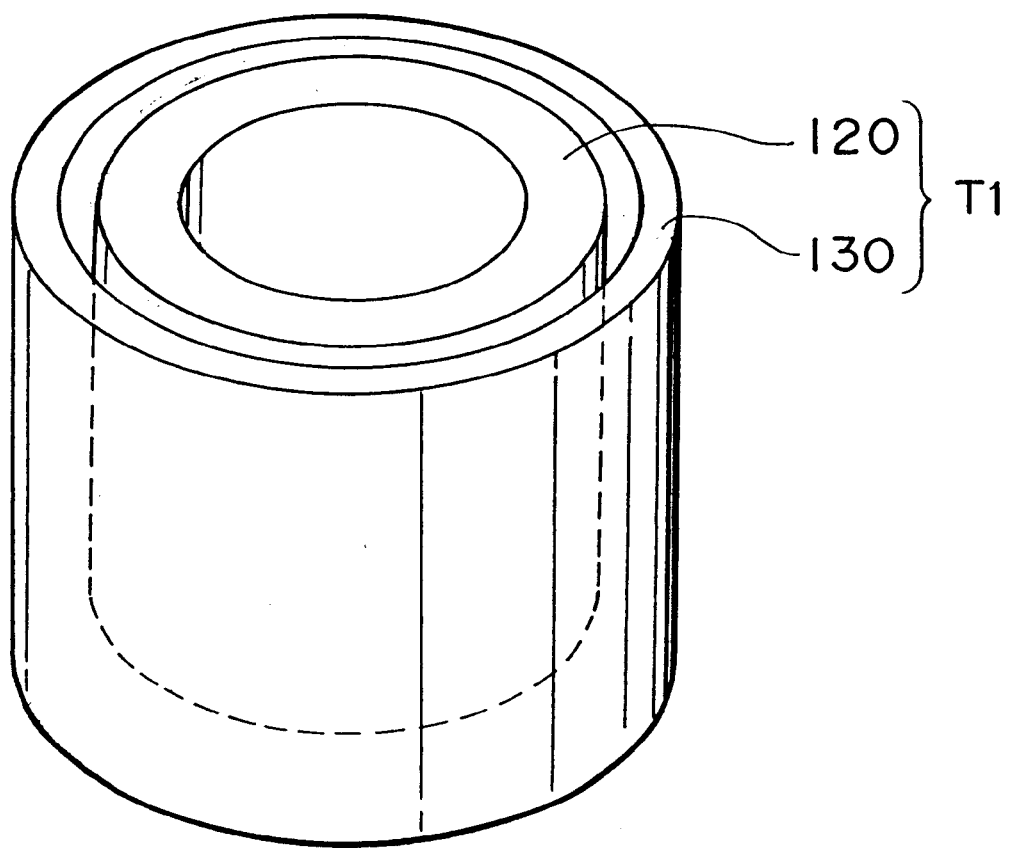
FIG. 6 is a perspective view showing the rotary transformer of FIG. 4.

Meanwhile, in the rotary magnetic head apparatus 10 of FIG. 4, a cylindrical stator core 120 such as that shown in FIG. 6 is fixed to the fixed drum 1. A rotor core 130 of a rotary transformer T1 is fixed to the flange 2a of the rotary drum 2. The stator core 120 and the rotor core 130 are disposed coaxially with the shaft 5 as the center, and the outside diameter of the stator core 120 is set to be smaller than the internal diameter of the rotor core 130. As a result, the outer surface of the stator core 120 and the inner surface of the rotor core 130 are placed in a non-contact manner with a predetermined gap. The channels CH1 to CH4 of the rotary magnetic head apparatus 10 of FIG. 4 are formed in a ring form in an axial direction.

When power is supplied in a predetermined power-supply pattern to the coil 7 of the stator MS of the motor M, the rotor MR of the motor M, the shaft 5, the flange 2a, and the rotor core 130 of the rotary transformer T1 rotate in a non-contact manner with a predetermined gap with respect to the fixed drum 1 and the stator core 120.

The non-contact-type transmission apparatus of the present invention can be applied to both the plane-opposing-type rotary transformer T such as that shown in FIGS. 3 and 5 and the cylindrical-type rotary transformer T1 such as that shown in FIGS. 4 and 6.

Next, referring to FIG. 7, an example of the wiring construction of the rotary transformer T shown in FIGS. 3 and 5 will be described.

Figure 7:
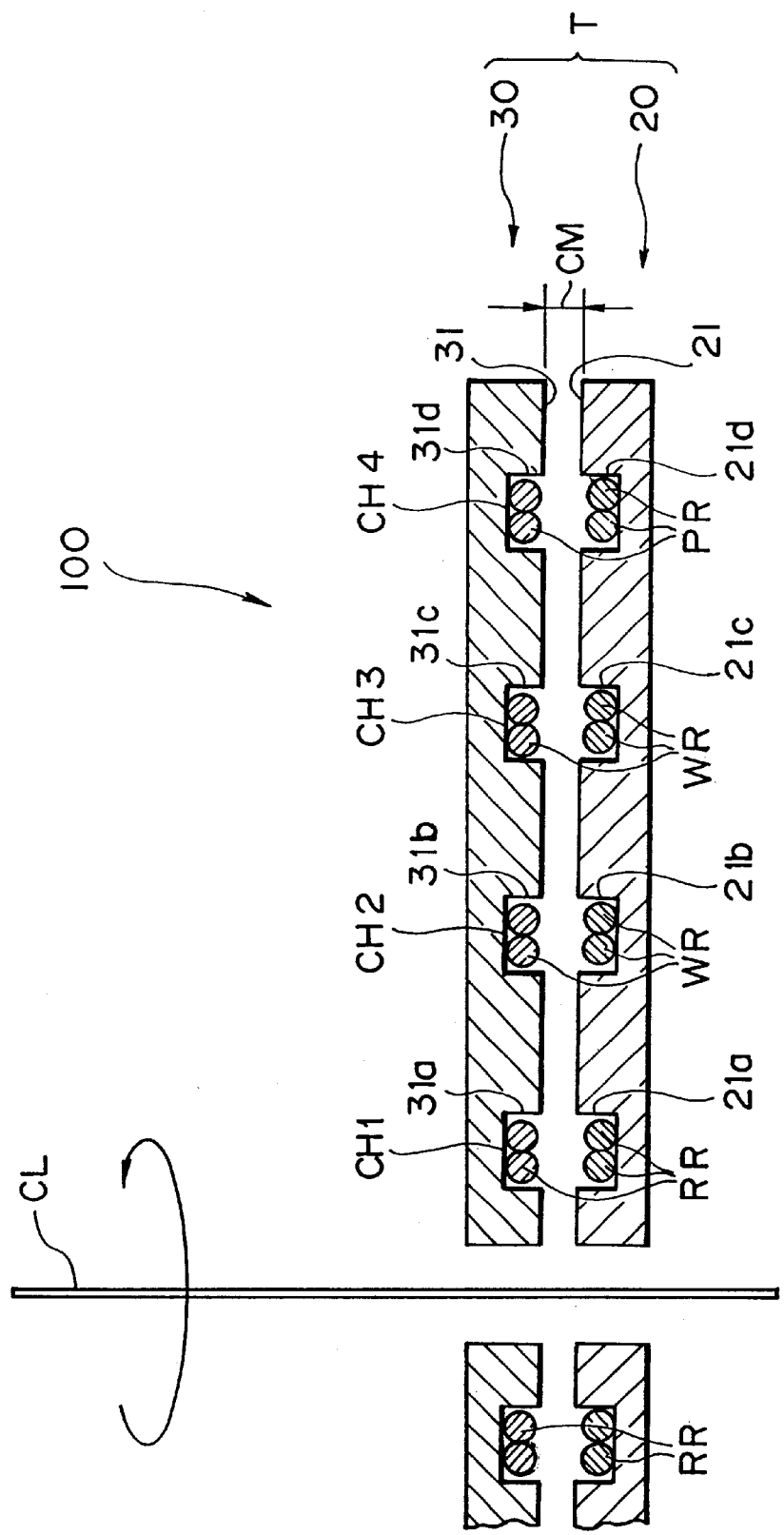
FIG. 7 is a partly omitted, sectional view showing an example of the construction of the rotary transformer of FIG. 5.

Since the right and left portions of the rotary transformer T shown in FIG. 7 are symmetrical, a part thereof is omitted, the stator core 20 and the rotor core 30 are disposed opposite to each other, and a predetermined gap CM is set.

The internal surface 21 of the stator core 20 is formed with, for example, four grooves 21a, 21b, 21c, and 21d coaxially with the center axis CL as the center from the inner peripheral side to the outer peripheral side. Similarly, an internal surface 31 of the rotor core 30 is formed with, for example, grooves 31a, 31b, 31c, and 31d coaxially with the center axis CL as the center. The grooves 21a to 21d and the grooves 31a to 31d are at opposing positions to each other.

Reproduction signal transmission rings RR are disposed in the grooves 21a and 31a, and recording signal transmission rings WR are disposed in the grooves 21b and 31b. Recording signal transmission rings WR are disposed in the grooves 21c and 31c, and power transmission rings PR are disposed in the grooves 21d and 31d.

The reproduction signal transmission rings RR, the recording signal transmission rings WR and WR, and the power transmission rings PR are each produced by winding, for example, an insulating, coated wire material into a ring form for a plurality of times. The rotor core 30 and the stator core 20 themselves are produced into a circular-plate form or a ring form in a magnetic-permeable material, such as ferrite. The reproduction signal transmission rings RR and the recording signal transmission rings WR are a signal transmission system, and the power transmission rings are a power-supply system.

Next, referring to FIGS. 8 and 9, a rotary transformer T of a first embodiment of the present invention, and the surrounding functional portions of the rotary transformer will be described.

Figure 8:
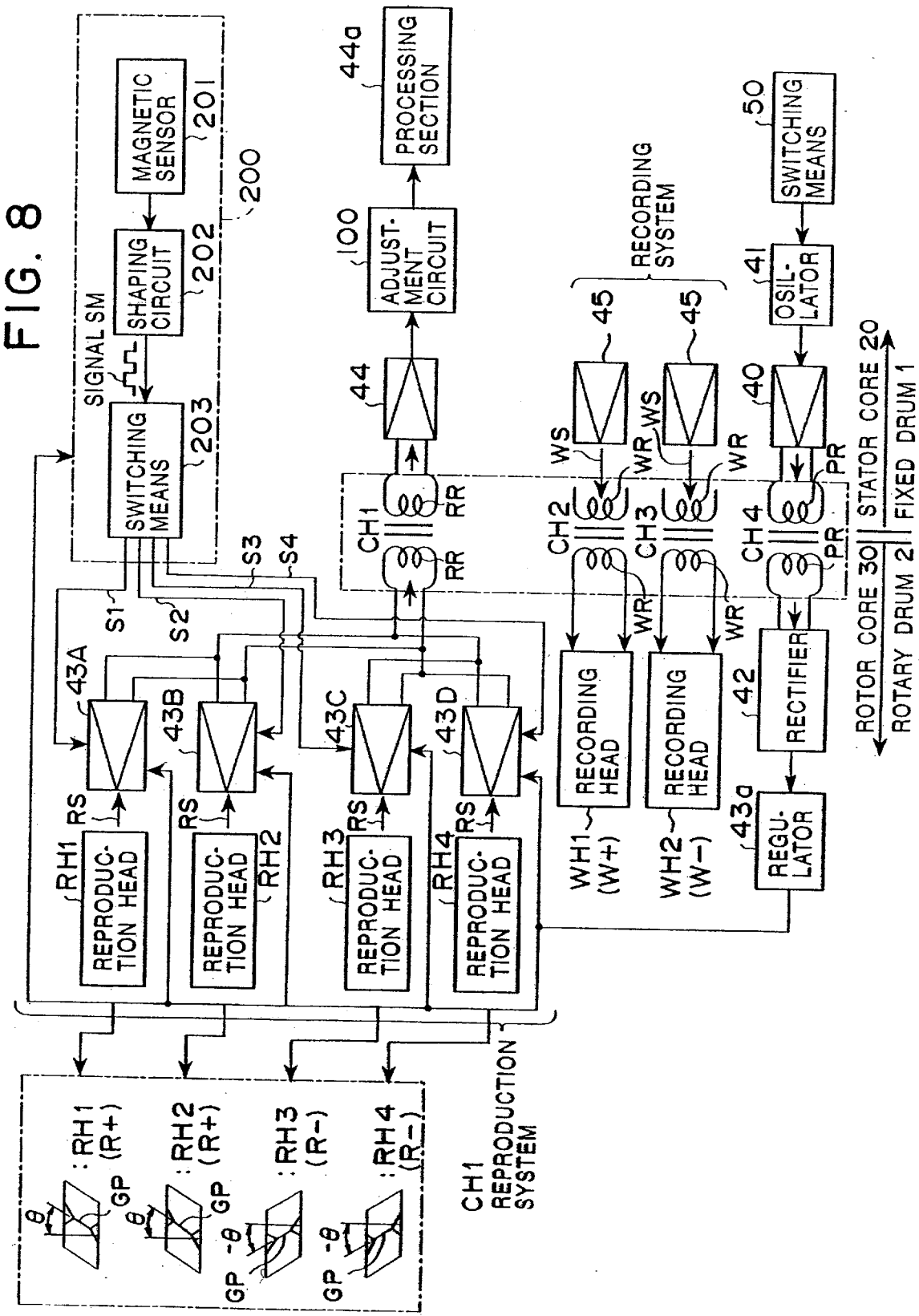
FIG. 8 shows a rotary transformer according to a first embodiment of the rotary magnetic head apparatus of FIG. 1, and the surrounding arrangement of the rotary transformer.

The rotary transformer T of FIG. 8 is shown differently to the rotary transformer T of FIG. 7, and the channels CH1 to CH4 are drawn in the vertical direction in FIG. 8.

As shown in FIGS. 8 and 7, the feature is that in the rotary transformer T, two areas, a power-supply area for power transmission rings PR and a signal area for reproduction signal transmission rings RR and recording signal transmission rings WR are present separately. The areas for the power transmission rings PR and the reproduction signal transmission ring RR are separated by the area of the two recording signal transmission rings WR and WR.

These two recording signal transmission rings WR and WR serve as a crosstalk prevention section of the rotor core 30 and a crosstalk prevention section of the stator core 20 for preventing crosstalk in the area between the power transmission ring PR and the reproduction signal transmission ring RR.

In FIG. 8, the power transmission ring PR of the stator core 20 inside the power transmission ring PR of the channel CH4 is connected to an oscillator 41 via a power drive 40. The direct current with a high frequency generated by this oscillator 41 is converted into an alternating current, and the power drive 40 supplies the alternating current to the power transmission ring PR of the stator core 20. The power transmission ring PR of the stator core 20 transmits the alternating current to the power transmission ring PR of the rotor core 30 in a non-contact manner, the transmitted alternating current is rectified into a direct current by a rectifier 42, and the direct current is set to a desired voltage by a regulator 43a.

The current set to the voltage by the regulator 43a is preferably supplied to the reproduction amplifiers 43A, 43B, 43C, and 43D of the reproduction heads RH1, RH2, RH3, and RH4 and used to amplify the reproduction current obtained by the reproduction head RH. Also, the current of the regulator 43a can be supplied to reproduction signal selection means 200.

The reproduction heads RH1, RH2, RH3, and RH4 set in the rotary drum are connected to the reproduction amplifiers 43A to 43D, respectively, so that the reproduction signal RS can be supplied thereto, respectively. These reproduction amplifiers 43A to 43D amplify the supplied reproduction signal RS independently. These reproduction amplifiers 43A to 43D can supply the amplified reproduction signal to the reproduction signal transmission ring RR of the rotor core 30 placed in channel CH1 of the rotary transformer T. This reproduction signal transmission ring RR can transmit the reproduction signal to the reproduction signal transmission ring RR of the stator core without contact.

The reproduction amplifiers 43A to 43D are connected to the reproduction signal selection means 200, and the reproduction signal selection means 200 can transmit selection signals S1 to S4 to the reproduction amplifiers 43A to 43D, respectively. Only the reproduction amplifiers 43A to 43D to which the reproduction signal is supplied can amplify the reproduction signal RS and transmit it to the reproduction signal transmission ring RR.

The reproduction signal selection means 200 includes, for example, a magnetic sensor 201, a shaping circuit 202, and switching means 203. The magnetic sensor 201 is set in the rotary drum 2 shown in FIG. 1, and the magnet, the magnetism of which is detected by the magnetic sensor, is fixed to the fixed drum 1.

As a result of the rotary drum 2 rotating with respect to the fixed drum 1, the magnetic sensor 201 detects the magnetism of the magnet of the fixed drum 1 for each rotation and sends the detected signal to the shaping circuit 202, whereby the waveform thereof is shaped, and a rectangular signal SM is sent to the switching means 203. The switching means 203 generates the selection signals S1 to S4 in accordance with the signal SM.

Since the switching means 203 supplies the selection signals S1 to S4 to the reproduction amplifiers 43A to 43D, respectively, the reproduction amplifiers 43A to 43D can transmit the reproduction signals RS from each of the reproduction heads RH1 to RH4 to the reproduction signal transmission ring RR of the rotor core 30 of FIG. 8 at a timing shown in FIG. 9A. Since the reproduction signals of the four reproduction amplifiers 43A to 43D are connected and sent to the reproduction signal transmission ring RR of the rotor core 30, as shown in FIG. 9B, an arranged reproduction signal RSA for one channel can be produced.

As shown in FIG. 8, each of the reproduction heads RH1 to RH4 has a predetermined azimuth angle. That is, the magnetic gap GP of each of the reproduction heads RH1 and RH2 has a +azimuth angle θ, and the magnetic gap GP of each of the reproduction heads RH3 and RH4 has a −azimuth angle θ.

Therefore, the reproduction signal RS of the reproduction heads RH1 and RH2, shown in FIG. 9A, and the reproduction signal RS of the reproduction heads RH3 and RH4 are such that recording tracks with an inverse azimuth are reproduced. The reproduction heads RH1 (R+) and RH2 (R+) in FIGS. 8 and 9 show that the magnetic gap GP has a +azimuth angle, and the reproduction heads RH3 (R−) and RH4 (R−) show that the magnetic gap GP has a −azimuth angle. Also, it is shown in FIG. 2 that the magnetic recording head WH1 (W+) has a +azimuth angle, and the recording head WH2 (W−) has a −azimuth angle.

As described above, in the embodiment of FIG. 8, the rotary drum 2 has plural, for example, four reproduction heads RH1 to RH4. In the case where, for example, the recording tracks recorded on a magnetic tape by a non-tracking reproduction method are reproduced by scanning at a density twice that of the normal case, the reproduction signal RS of each of the reproduction heads RH1 to RH4 makes it possible to generate a reproduction signal RSA arranged for one channel in a time sequence as shown in FIG. 9B. As a result, if the reproduction signal transmission rings RR and RR in the rotary transformer T of FIG. 8 are present for one channel, the reproduction signal RSA can be sent to a reproduction amplifier 44 of the stator core 20 without contact.

An adjustment circuit 100 shown in FIG. 8 can adjust each reproduction signal RS of the reproduction signal RSA of FIG. 9B amplified by the reproduction amplifier 44 as described above, for example, in accordance with the characteristics of each of the reproduction heads RH1 to RH4. For example, the adjustment circuit 100 adjusts the level, the frequency characteristics, and the phase characteristics of the signal so that it is approximated. However, in addition to the case in which this adjustment circuit 100 is disposed in a stage after the reproduction amplifier 44 of the stator core 20, it is a matter of course that the adjustment circuit 100 may be disposed in a stage before the reproduction signal transmission ring RR of the rotor core 30.

Further, although the magnetic tape TP is wound helically at an angle of nearly 90 degrees by the rollers 4c and 4d as shown in FIG. 9A, it is not limited to this example. The two reproduction heads RH1 and RH2 are disposed apart by 90 degrees from the rotary drum 2 of FIG. 9A, and the two reproduction heads RH1 and RH2 having a +azimuth angle are aligned with respect to the rotary drum 2 in such a manner as to reproduce a signal from a track offset by one track. Similarly, the reproduction heads RH3 and RH4 having a −azimuth angle are also aligned with respect to the rotary drum 2 in such a manner as to reproduce a signal from a track offset by one track.

Further, in the adjustment circuit 100 of FIG. 8, the reproduction signal RS adjusts the individual variations caused by the reproduction heads RH1 to RH4. As the adjustment object, for example, a reference signal written at a predetermined place is reproduced, an adjustment value is determined according to the signal level at the time, error detection, or the like, and the adjustment of the amplitude of each reproduction signal, the adjustment of the frequency, the adjustment of the phase, and the like can be performed. The reproduction signal RS digitized by this adjustment circuit 100 is detected for an error for each block and stored in a memory. As a result, an on-track signal of a +azimuth track is selected from two types of reproduction signals RS with +azimuth, and reproduction is performed by a commonly called non-tracking reproduction method.

Next, referring to FIGS. 10 and 11, a description will be given of a rotary transformer T according to a second embodiment of the present invention, and the surrounding functional portions of the rotary transformer.

Figure 10:
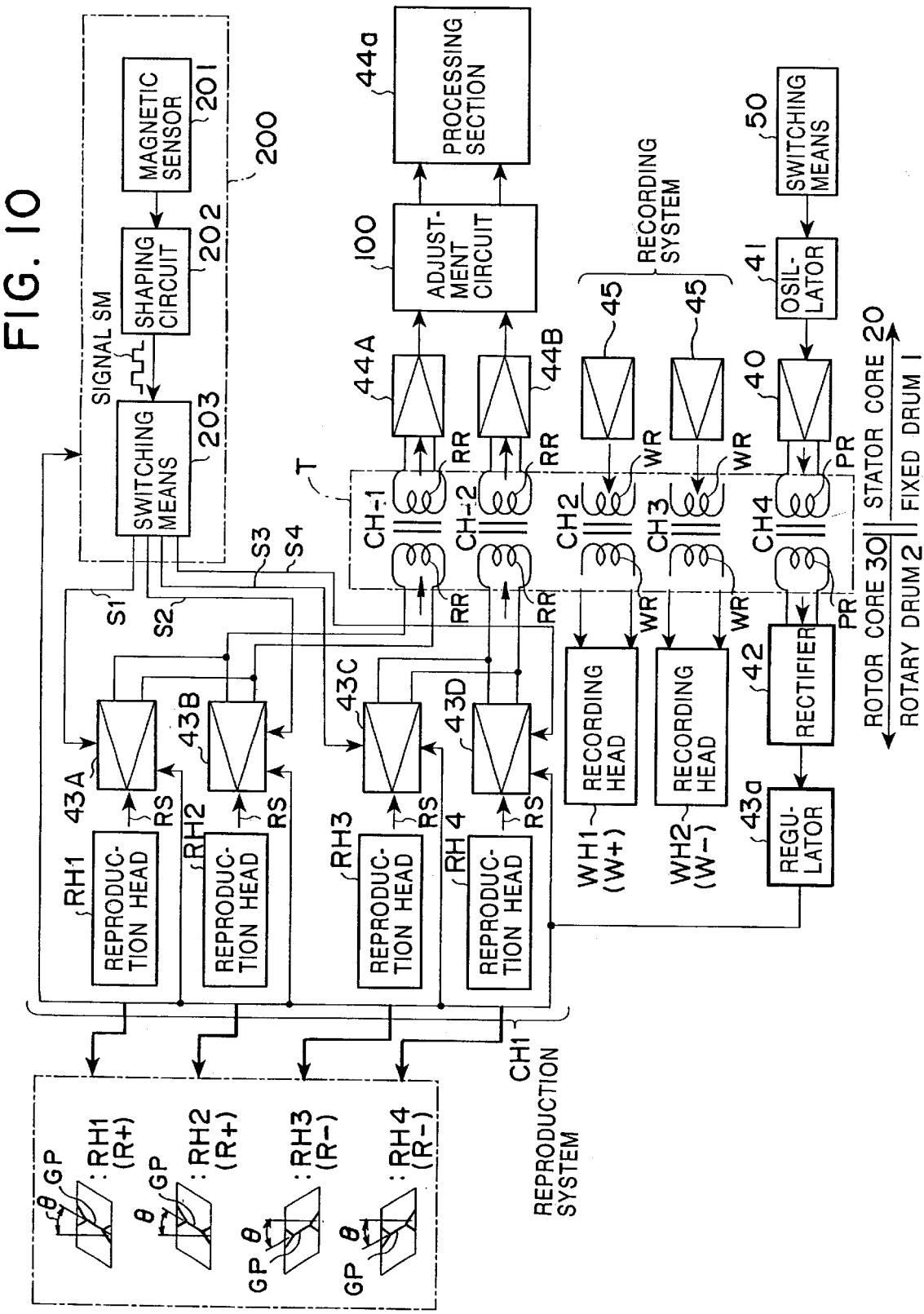
FIG. 10 shows a rotary transformer according to a second embodiment of the rotary magnetic head apparatus of FIG. 1, and the surrounding arrangement of the rotary transformer.
Figure 11A:
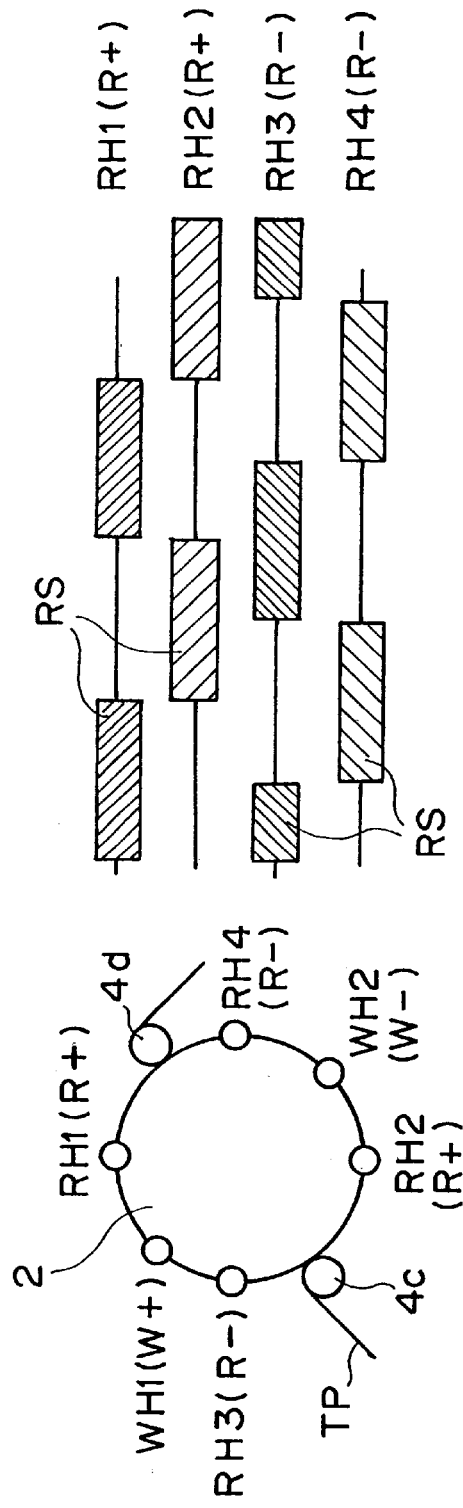
FIGS. 11A, 11B, and 11C show an example of the arrangement of each reproduction head and recording head, and an example of the arrangement of a reproduction signal of the reproduction head in the embodiment of FIG. 10.
Figure 11B:
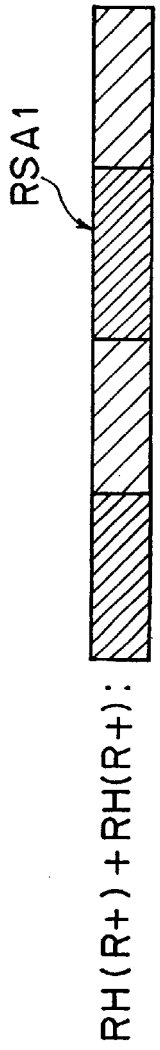
Figure 11C:
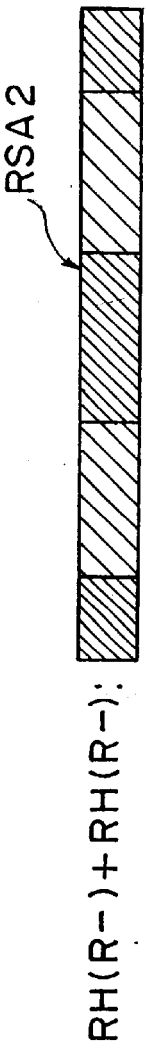

In the embodiment of FIGS. 10 and 11, as is clear from a comparison with FIGS. 9A and 9B, a magnetic tape TP is wound around the rotary drum 2 for almost 180 degrees by a helical scan method by the rollers 4c and 4d. The rotary drum 2 includes four reproduction heads RH1, RH2, RH3, and RH4, and two recording heads WH1 and WH2.

As shown in FIG. 8, the reproduction heads RH1 and RH2 send the reproduction signal RS to the reproduction amplifiers 43A and 43B, respectively. In a similar manner, the reproduction heads RH3 and RH4 can also send a reproduction signal RS to the reproduction amplifiers 43C and 43D, respectively. The reproduction amplifiers 43A and 43B are connected to the reproduction signal transmission ring RR of channel CH1-1 of the rotary transformer T. Similarly, the reproduction amplifiers 43C and 43D are also connected to the reproduction signal transmission ring RR of another reproduction channel CH1-2 of the rotary transformer T.

The reproduction signal transmission ring RR of the stator core 20 is opposite to the reproduction signal transmission ring RR of the rotor core 30 of the channel CH1-1, and this reproduction signal transmission ring RR is connected to a reproduction amplifier 44A.

Similarly, the reproduction signal transmission ring RR of the stator core 20 opposes the reproduction signal transmission ring RR of the rotor core 30 of the reproduction channel CH1-2. This reproduction signal transmission ring RR is connected to a reproduction amplifier 44B. These reproduction amplifiers 44A and 44B are connected to a processing section 44a via the adjustment circuit 100.

With such a construction as shown in FIG. 11A, from the two reproduction signals RS of the reproduction signals RS1 and RS2, a reproduction signal RSA1 arranged as shown in FIG. 11B is formed, and this reproduction signal can be sent to the adjustment circuit 100 via the reproduction channel CH1-1 of FIG. 10. In a similar manner, also for the reproduction signals RS of the reproduction heads RH3 and RH4, the arranged reproduction signal RSA2 can be sent to the adjustment circuit 100 side, as shown in FIG. 1C. In this way, the reproduction signals RS of the four reproduction heads RH1 to RH4 can be transmitted to an outside source via the two reproduction channels CH1-1 and CH1-2.

Next, referring to FIGS. 12 and 13, a description will be given of a rotary transformer T according to a third embodiment of the present invention, and the surrounding functional portions of the rotary transformer.

Figure 12:
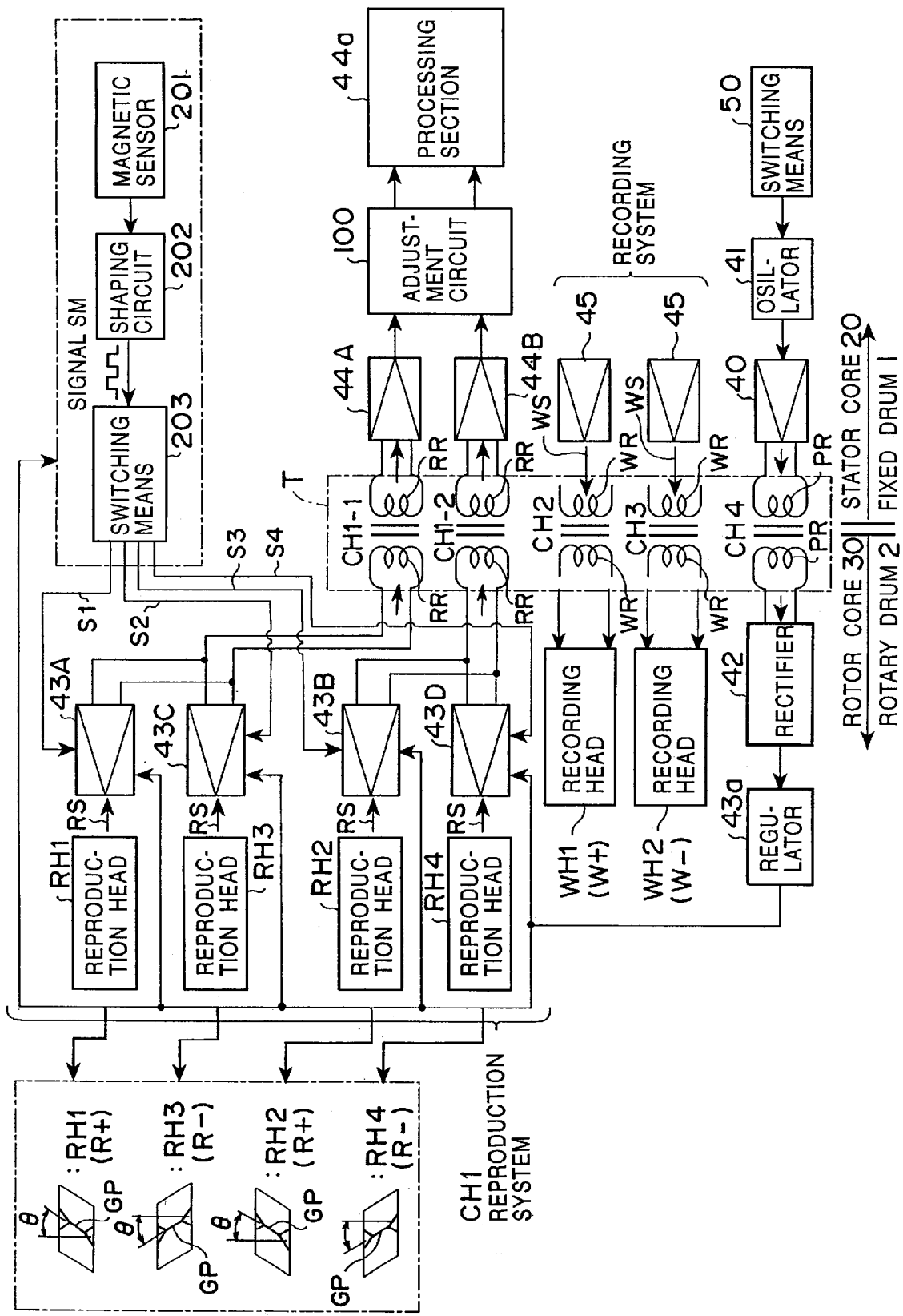
FIG. 12 shows a rotary transformer according to a third embodiment of the rotary magnetic head apparatus of FIG. 1, and the surrounding arrangement of the rotary transformer.

In the embodiment of FIGS. 12 and 13, the magnetic tape TP is also wound around the rotary drum 2 for almost 180 degrees by a helical scan method by the rollers 4c and 4d. In this case, the reproduction amplifiers 43A and 43C of the reproduction heads RH1 and RH3 are connected to the reproduction signal transmission ring RR of the rotor core 30.

Similarly, the reproduction amplifiers 43B and 43D of the reproduction heads RH2 and RH4 are connected to the reproduction signal transmission ring RR of another reproduction channel CH1-2.

From the reproduction signal RS of the reproduction heads RH1 and RH3, as shown in FIGS. 13A and 13B, an arranged reproduction signal RSA3 is formed in a time sequence and can be transmitted to the adjustment circuit 100 without contact via the reproduction channel CH1-1.

Similarly, from the reproduction signal RS of the reproduction heads RH2 and RH4, a reproduction signal RSA4 arranged as shown in FIG. 13C is formed and can be sent to the adjustment circuit 100.

Each of the reproduction heads RH1, RH2, RH3, and RH4 reproduces information of the magnetic tape TP of FIG. 1 and sends the reproduction signal RS to the reproduction amplifiers 43A, 43B, 43C, and 43D, and the reproduction signal RS amplified by the reproduction amplifiers 43A, 43B, 43C, and 43D is sent to the reproduction signal transmission ring RR of the rotor core 30 of the channel CH1. The amplified reproduction signal RS is sent from the reproduction signal transmission ring RR of the rotor core 30 without contact to the reproduction signal transmission ring RR of the stator core 20. On the stator core 20 side, the sent reproduction signal RS is further amplified by the reproduction amplifier 44. The amplified reproduction signal RS is subjected to a signal adjustment process by the adjustment circuit 100 and sent to the processing section 44a outside the rotary magnetic head apparatus.

A recording amplifier 45 on the fixed drum 1 side of FIG. 8, and other figures, sends recording current from the recording signal source to the recording signal transmission ring WR of the channels CH2 and CH3 of the stator core 20. When the recording signal WS is sent from the recording signal transmission ring WR of the stator core 20 to the recording signal transmission ring WR of the rotor core 30, this recording current is directly sent from the recording signal transmission ring WR of the rotor core 30 to the recording head WH.

Since, as described above, the recording head WH is directly connected to the recording signal transmission ring WR of the rotor core 30, it is possible to decrease the impedance in the low-frequency region in the recording signal system formed of the recording head WH in the low-frequency region and the recording signal transmission ring WR of the rotor core 30.

The recording signal transmission rings WR and WR disposed in the channels CH2 and CH3 are capable of preventing crosstalk between the reproduction system of channel CH1 and the power-transmission system of channel CH4. That is, the recording signal transmission rings WR and WR reduce crosstalk from the power-transmission system of the channel CH4 to the reproduction signal system of the channel CH1.

Next, referring to FIGS. 14 and 15, a description will be given of a rotary transformer T according to a fourth embodiment of the present invention, and the surrounding functional portions of the rotary transformer.

Figure 14:
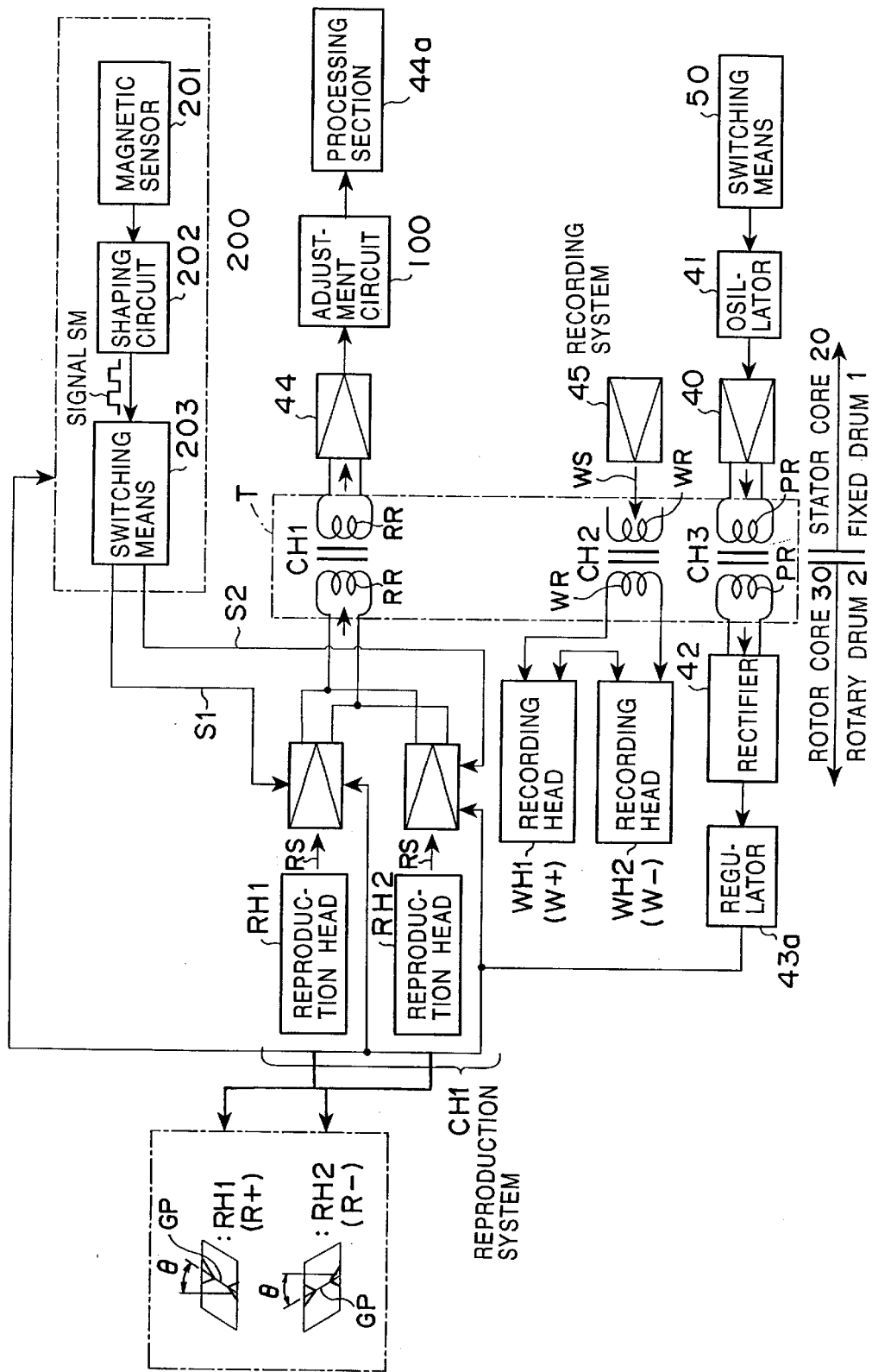
FIG. 14 shows a rotary transformer according to a fourth embodiment of the rotary magnetic head apparatus of FIG. 1, and the surrounding arrangement of the rotary transformer.
Figure 16A:
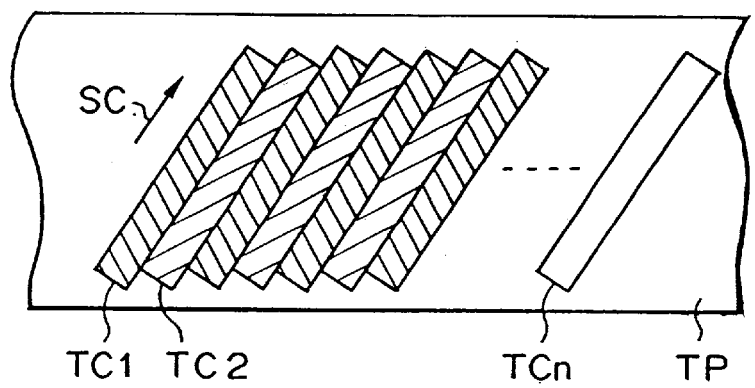
FIGS. 16A, 16B, and 16C are views illustrating a non-tracking reproduction method used in the conventional art.
Figure 16B:
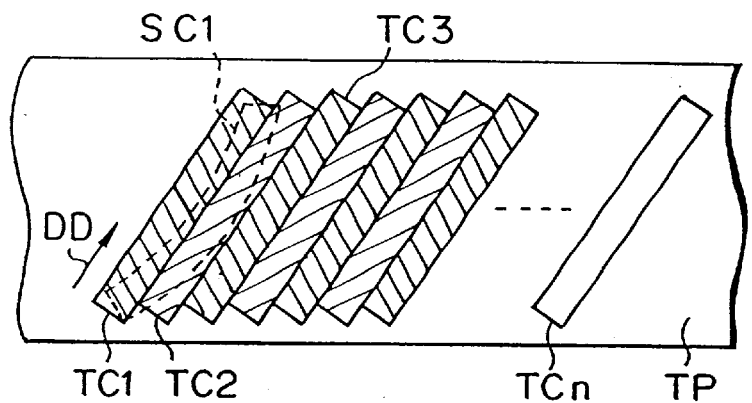
Figure 16C:
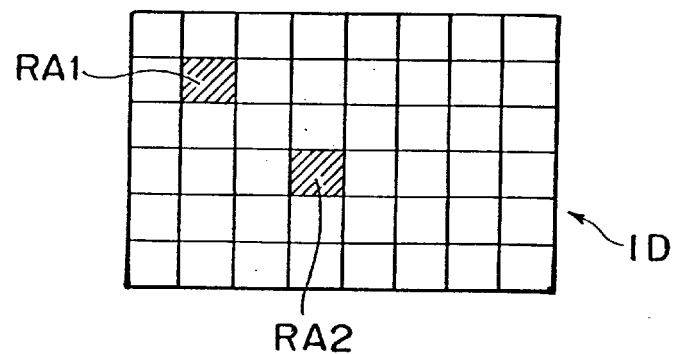

In the embodiment of FIGS. 14 and 15, the magnetic tape TP is also wound around the rotary drum 2 for almost 180 degrees by a helical scan method by the rollers 4c and 4d. The recording amplifier 45 on the fixed drum 1 side sends recording current from the recording signal source to the recording signal transmission ring WR of the channel CH2 of the stator core 20.

When the recording signal WS is sent from the recording signal transmission ring WR of the stator core 20 to the recording signal transmission ring WR of the rotor core 30, this recording current is directly sent from the recording signal transmission ring WR of the rotor core 30 to the recording heads WH1 and WH2. The recording system does not have a circuit inside the drum and is connected in series from the rotor core 30 for one channel to the recording head WH1 having a +azimuth angle and the recording head WH2 having a −azimuth angle. This connection may be in parallel, or may be switched by an electronic switch provided inside the drum.

The two recording heads WH1 and WH2 are disposed apart by 180 degrees with respect to the rotary drum 2. Recording current flows alternately to the two recording heads WH1 and WH2 for each rotation of the rotary drum 2, and the tracks with the two azimuths are recorded at two rotations. That is, the two recording heads WH1 and WH2 are aligned with respect to the rotary drum 2 in such a way that tracks with the two azimuths are formed alternately on the magnetic tape TP. Therefore, the magnetic tape TP is moved by two tracks while the rotary drum 2 is rotated two times. As shown in FIGS. 15A and 15B, from the recording signal WS of the recording heads WH1 and WH2, an arranged recording signal WSA is formed in a time sequence.

Since, as described above, the recording heads WH1 and WH2 are directly connected to the recording signal transmission ring WR of the rotor core 30, it is possible to decrease the impedance in the low-frequency region in the recording signal system formed of the recording heads WH1 and WH2 in the low-frequency region and the recording signal transmission ring WR of the rotor core 30.

The recording signal transmission ring WR disposed in the channel CH2 can prevent crosstalk between the reproduction system of the channel CH1 and the power-transmission system of the channel CH3. That is, the recording signal transmission ring WR reduces crosstalk from the power-transmission system of the channel CH3 to the reproduction system of the channel CH1.

The reproduction amplifiers 43A and 43B of the reproduction heads RH1 and RH2 are connected to the reproduction signal transmission ring RR of the rotor core 30. The two reproduction heads RH1 and RH2 are disposed apart by 180 degrees with respect to the rotary drum 2, and the reproduction head RH1 having a +azimuth angle and the reproduction head RH2 having a −azimuth angle are each aligned to the rotary drum 2 so as to reproduce a signal from a track offset by one track.

As shown in FIGS. 15A and 15C, from the reproduction signal RS of the reproduction heads RH1 and RH2, an arranged reproduction signal RSA5 is generated in a time sequence, and can be transmitted to the adjustment circuit 100 side via the channel CH1 without contact.

Each of the reproduction heads RH1 and RH2 reproduces the information of the magnetic tape TP of FIG. 1 and sends the reproduction signal RS to the reproduction amplifiers 43A and 43B, and the reproduction signal RS amplified by the reproduction amplifiers 43A and 43B is sent to the reproduction signal transmission ring RR of the rotor core 30 of the channel CH1. The amplified reproduction signal RS is sent from the reproduction signal transmission ring RR of the rotor core 30 to the reproduction signal transmission ring RR of the stator core 20 without contact, and on the stator core 20 side, the sent reproduction signal RS is further amplified by the reproduction amplifier 44. The amplified reproduction signal RS is subjected to signal adjustment processing by the adjustment circuit 100 and sent to the processing section 44a outside the rotary magnetic head apparatus.

The tape speed and the drum rotational speed are the same as those during recording. However, it is so designed that while the rotary drum 2 makes one rotation, each of the reproduction heads RH1 and RH2 reproduces the tracks with two azimuths, and while the magnetic tape TP is moved by two tracks with the two azimuths, the tracks with the two azimuths are reproduced by two times.

Although each of the recording heads WH1 and WH2 and each of the reproduction heads RH1 and RH2 are disposed apart by 180 degrees with respect to the rotary drum 2, it is not limited to this example, and they may be disposed apart by less than 180 degrees if they contact the magnetic tape TP at different times.

Switching means 50 of FIG. 8, and other figures, is a switching means for turning on/off the actuation of the oscillator 41. This switching means 50 turns on or off the oscillation actuation for supplying power by turning on or off the oscillator 41. The reason why the oscillator 41 is turned on/off in this manner is as follows.

When the recording head WH is in contact with the magnetic tape TP (during signal recording), the switching means 50 turns off the oscillator 41, and when the recording head WH is not in contact with the magnetic tape TP (during signal reproduction), the switching means 50 turns on the oscillator 41.

When the recording heads WH1 and WH2 are in contact with the magnetic tape TP, that is, when the recording heads WH1 and WH2 are recording a signal onto the magnetic tape TP, the reproduction head RH is not reproducing a signal of the magnetic tape TP. Therefore, since there is no need to supply power to the reproduction amplifier 43 of FIG. 8 from the oscillator 41, the oscillator 41 is turned off. In comparison, when the recording heads WH1 and WH2 are not in contact with the magnetic tape TP, that is, when the reproduction heads RH1 to RH4 are reproducing a signal of the magnetic tape TP, the oscillator 41 is turned on and power is supplied from the regulator 43a to the reproduction amplifiers 43A to 43D, making it possible to amplify the reproduction signal RS of the reproduction head RH.

Therefore, since in a state in which the recording head WH is in contact with the magnetic tape TP, the oscillator 41 is turned off, it is possible to reliably prevent crosstalk from the power system of the channel CH4 to the reproduction signal system of the channel CH1 in FIG. 8.

In the oscillator 41, in the case where direct current is converted into alternating current and the alternating current is converted again into direct current by the rectifier 42, a method for preventing crosstalk from the power system of the channel CH4 to the recording signal system (the reproduction signal system of the channel CH1) of the channel CH2 can be adopted in such a way that the highest frequency band of the alternating current (AC) does not overlap with the frequency band of the recording signal of the channel CH2.

Although the above embodiments of the present invention describe the plane-opposing-type rotary transformer T shown in FIG. 2, in addition to this, the above-described embodiments are applicable to the cylindrical-type rotary transformer T shown in FIGS. 4 and 6.

In the rotary transformer which is a non-contact-type transmission apparatus of the embodiment of the present invention, since both the signal area and the power area are provided, and a crosstalk prevention section is provided between them, it is possible to transmit both signals and power reliably without contact. This makes it possible to prevent deterioration of the SIN ratio by providing a first-stage reproduction amplifier inside the drum of the rotary magnetic head apparatus.

In the embodiments shown in the figures, since the construction is formed such that power is supplied from the power system to the reproduction amplifiers 43A to 43D, as the reproduction head RH, for example, a magneto-resistive element head (MR) may be used. The magneto-resistive element head for reproduction always requires bias current when a reproduction signal is to be obtained. By sending a bias from the regulator 43a to the reproduction amplifiers 43A to 43D, the magneto-resistive element head can be operated to obtain a reproduction signal. This magneto-resistive element head is a head which causes variation in the resistance when the magnetic field is varied. This magneto-resistive element head converts variation in the signal magnetic-field (input signal) into resistance variation and can pick it up as a variation in the reproduction output signal (voltage).

This magneto-resistive element head is capable of obtaining a highly stable reproduction output signal without depending upon the speed of the magnetic tape TP.

In the embodiments of the present invention, the design is such that the times in which the plurality of reproduction heads RH1, RH2, RH3, and RH4 contact a tape-like information recording medium do not overlap with each other, and an amplifier for reproduction is connected to each of the reproduction heads RH1, RH2, RH3, and RH4. After the reproduction signal RS is amplified by this amplifier, the reproduction signal is arranged in sequence by the reproduction signal selection means 200 functioning as a switching circuit and formed into a reproduction signal of one channel. After being formed into the reproduction signal of one channel, this reproduction signal of one channel is sent to the signal processing section side without contact via the rotary transformer.

That is, since the contact of each of the reproduction heads RH1, RH2, RH3, and RH4 with the tape-like information recording medium is independent in relation to time, the reproduction signal RS can be formed into one channel by switching the reproduction signal RS after being amplified.

As described above, in the embodiments of the present invention, in the case where the information of the recording tracks which is recorded on the tape-like information recording medium is reproduced by a non-tracking reproduction method by using a multiple of two reproduction heads and one or more reproduction channels, a reproduction signal from the plurality of reproduction heads is selected and switched inside the rotary drum, and for example, the reproduction signal is collected to one channel or two channels, and then the reproduction signal is transmitted without contact by using the rotary transformer T. As a result, it is not necessary to set a plurality of rotary transformers in the rotary magnetic head apparatus, resulting in a smaller size and a lower cost.

Although the embodiments of the present invention describe an example in which four reproduction heads are used, in addition to this example, it is a matter of course that the present invention is applicable to a case in which two, three, five or more reproduction heads are provided. Also, although two recording heads are shown in the figures, in addition to this example, it is a matter of course that the present invention is applicable to a case in which three or more recording heads, or only one recording head is used.

As has been described up to this point, according to the present invention, a smaller size can be achieved in the case where signals of a plurality of recording tracks which are recorded on a tape-like information recording medium are reproduced by using a plurality of reproduction heads without depending on the arrangement of the recording tracks in the information recording medium.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A rotary magnetic head apparatus which reproduces a signal of a plurality of recording tracks recorded on a tape-like information recording medium by using a plurality of reproduction heads without depending on the arrangement of the recording tracks in the information recording medium, said rotary magnetic head apparatus comprising:

a transmission apparatus for transmitting power and signals between a rotor and a stator in a non-contact manner;

a rotary drum having a rotor of a transmission apparatus and a plurality of reproduction heads;

a fixed drum having a stator of the transmission apparatus;

reproduction signal selection means for selecting a reproduction signal from each reproduction head and arranging the reproduction signal from each reproduction head in sequence;

a rotor reproduction signal wiring section which is disposed in the rotor and to which a reproduction signal of each reproduction head is provided, which reproduction signal is transmitted from the reproduction signal selection means; and a stator reproduction signal wiring section, disposed in the stator, for receiving a reproduction signal in a non-contact manner from the rotor reproduction signal wiring section, wherein said rotary magnetic head apparatus is enabled to perform a reproduction operation utilizing a non-tracking procedure.

2. A rotary magnetic head apparatus according to claim 1, wherein the reproduction signal selection means arranges a reproduction signal from a plurality of reproduction heads having +azimuth and a reproduction signal from a plurality of reproduction heads having −azimuth in sequence.

3. A rotary magnetic head apparatus according to claim 2, wherein the reproduction signal selection means arranges a reproduction signal from a plurality of reproduction heads having +azimuth as a first arrangement signal and a reproduction signal from a plurality of reproduction heads having −azimuth as a second arrangement signal.

4. A rotary magnetic head apparatus according to claim 2, wherein the reproduction signal selection means arranges a reproduction signal from a reproduction head having +azimuth and a reproduction signal from a reproduction head having −azimuth in sequence.

5. A rotary magnetic head apparatus according to claim 1, wherein the reproduction signal selection means arranges a reproduction signal from a plurality of reproduction heads having +azimuth and differently arranges a reproduction signal from a plurality of reproduction heads having azimuth.

6. A rotary magnetic head apparatus according to claim 1, wherein the rotary drum comprises a plurality of recording heads.

7. A rotary magnetic head apparatus according to claim 6, wherein the stator of the transmission apparatus comprises a stator reproduction signal wiring section, a stator power-supply wiring section for transmitting power, a stator reproduction signal wiring section, disposed between the stator reproduction signal wiring section and the stator power-supply wiring section, to which a recording signal for the recording head is provided, and the rotor of the transmission apparatus comprises a rotor reproduction signal wiring section, a rotor power-supply wiring section for transmitting power between it and a stator power-supply wiring section of the stator, and a rotor recording signal wiring section, disposed between a rotor reproduction signal wiring section and the rotor power-supply wiring section, for receiving a reproduction signal from the stator reproduction signal wiring section in a non-contact manner.

8. A rotary magnetic head apparatus according to claim 1, wherein the rotary drum includes a plurality of recording heads, and there is further provided a stator recording signal wiring section which is disposed in the stator and to which a recording signal of the recording head is provided, and a rotor recording signal wiring section, disposed in the rotor, for receiving a recording signal from the stator recording signal wiring section in a non-contact manner and for supplying the reproduction signal to each recording head.

9. A rotary magnetic head apparatus according to claim 8, wherein the recording head performs recording of different azimuths while the rotary drum is rotated two times, and the reproduction head performs reproduction of different azimuths while the rotary drum is rotated one time.

10. A rotary magnetic head apparatus which reproduces a signal of a plurality of recording tracks recorded on a tape-like information recording medium by using a plurality of reproduction heads without depending on the arrangement of the recording tracks in the information recording medium, said rotary magnetic head apparatus comprising:

a transmission apparatus for transmitting power and signals between a rotor and a stator in a non-contact manner;

a rotary drum having a rotor of a transmission apparatus and a plurality of reproduction heads;

a fixed drum having a stator of the transmission apparatus;

reproduction signal selection means for selecting a reproduction signal from each reproduction head and arranging the reproduction signal from each reproduction head in sequence;

a rotor reproduction signal writing section which is disposed in the rotor and to which a reproduction signal of each reproduction head is provided, which reproduction signal is transmitted from the reproduction signal selection means; and a stator reproduction signal writing section, disposed in the stator, for receiving a reproduction signal in a non-contact manner from the rotor reproduction signal wiring section, wherein the rotary drum includes a plurality of recording heads, and there is further provided a stator recording signal wiring section which is disposed in the stator and to which a recording signal of the recording head is provided, and a rotor recording signal wiring section, disposed in the rotor, for receiving a recording signal from the stator recording signal wiring section in a non-contact manner and for supplying the reproduction signal to each recording head, and wherein the recording head performs recording of different azimuths while the rotary drum is rotated two times, and the reproduction head performs reproduction of different azimuths while the rotary drum is rotated one time.

11. A rotary magnetic head apparatus according to claim 10, wherein the recording heads with different azimuths contact an information recording medium at different timings.

* * * * *